(12) United States Patent
Weisbrot et al.

(10) Patent No.: US 7,228,602 B2
(45) Date of Patent: Jun. 12, 2007

US007228602B2

(54) METHOD OF ENCAPSULATING MATERIAL FROM HUMANS OR ANIMALS IN A NATURAL GEMSTONE AND ITS PRODUCT

(75) Inventors: Moti Weisbrot, Edmonton (CA); Venora Galon, Edmonton (CA)

(73) Assignee: 1061803 Alberta Ltd., Edmonton, Alberta (CA)

( * ) Notice: Subject to any disclaimer, the term of this patent is extended or adjusted under 35 U.S.C. 154(b) by 0 days.

(21) Appl. No.: 10/546,751

(22) PCT Filed: Feb. 25, 2004

(86) PCT No.: PCT/CA2004/000279

§ 371 (c)(1),
(2), (4) Date: May 8, 2006

(87) PCT Pub. No.: WO2004/076058

PCT Pub. Date: Sep. 10, 2004

(65) Prior Publication Data

US 2006/0261512 A1    Nov. 23, 2006

Related U.S. Application Data

(60) Provisional application No. 60/319,971, filed on Feb. 25, 2003, provisional application No. 60/481,592, filed on Nov. 3, 2003.

(51) Int. Cl.
*A61G 17/00* (2006.01)

(52) U.S. Cl. .................................. 27/1; 63/32; 264/234

(58) Field of Classification Search ....................... 27/1; D99/5; 63/32, 1.11, 1.14; 428/542.4; 264/234, 264/345
See application file for complete search history.

(56) References Cited

U.S. PATENT DOCUMENTS

| | | |
|---|---|---|
| 5,016,330 A | 5/1991 | Botsch |
| 5,208,957 A | 5/1993 | Hereford |
| 5,755,116 A | 5/1998 | Sparacino et al. |
| 5,813,098 A | 9/1998 | Schneider |
| 5,846,638 A | 12/1998 | Meissner |
| 5,950,287 A | 9/1999 | Cacciatore et al. |
| 6,170,136 B1 | 1/2001 | Wilson-Brokl |
| 6,189,188 B1 | 2/2001 | O'Hare |
| 6,200,507 B1 | 3/2001 | Dennis |
| 6,382,111 B1 | 5/2002 | Hojaji |
| 2002/0025392 A1 | 2/2002 | Yardley et al. |
| 2003/0017932 A1 | 1/2003 | VandenBiesen et al. |
| 2004/0031434 A1* | 2/2004 | VandenBiesen et al. ....... 117/1 |
| 2004/0154528 A1* | 8/2004 | Page ........................... 117/84 |
| 2005/0071964 A1* | 4/2005 | Vogel et al. ..................... 27/1 |
| 2006/0213041 A1* | 9/2006 | Cunningham et al. ........... 27/2 |

FOREIGN PATENT DOCUMENTS

EP       1069087 A       1/2001

\* cited by examiner

*Primary Examiner*—William L. Miller
(74) *Attorney, Agent, or Firm*—Bennett Jones LLP

(57) ABSTRACT

A method of creating a diamond includes the steps of creating entry points and internal passages in a natural or synthetic diamond, infiltrating a mixture comprising ashes produced from living human and animal parts or deceased human or animal parts into the diamond, and crystallizing the mixture. The diamond may then be repolished or refacetted. The invention also includes diamonds having discrete internal portions comprising ashes made from living human and animal parts, which internal portion are substantially transparent and which have an index refraction substantially matching that of the diamond.

7 Claims, No Drawings

METHOD OF ENCAPSULATING MATERIAL FROM HUMANS OR ANIMALS IN A NATURAL GEMSTONE AND ITS PRODUCT

This application is a 371 of PCT/CA04/00279 filed on Feb. 25, 2004, which claims the benefit of U.S. Provisional Application No. 60/319,971 filed on Feb. 25, 2003 and U.S. Provisional Application No. 60/481,592, filed on Nov. 3, 2003.

FIELD OF THE INVENTION

The present invention relates to gemstones which incorporate or encapsulate material from humans and animals, as well methods for creating such gemstones.

BACKGROUND OF THE INVENTION

Many people commemorate or celebrate various special occasions such as birthdays, engagements, weddings, anniversaries, graduations by giving gemstones such as diamonds and diamond jewelry as a gift. Many people develop a deep and lasting attachment with an animal such as the very close relationship which often develops between pets such as dogs and their owners. As a result, it is often desired to provide a natural gemstone as a precious gift that is somehow identified with or related to a particular person or animal. There is a desire to incorporate some part of that particular person or animal into a keepsake, such as a gemstone or jewelry.

In one prior art method described in pending U.S. patent application Ser. No. 10/100,666 (Publication No. 20030017932), synthetic gemstones are created from carbon recovered from the cremated remains of a person or animal. However, synthetic diamonds are difficult and costly to produce. Despite their additional cost, they are far less valuable than naturally occurring diamonds and are readily distinguishable from natural diamonds.

Therefore, there is a need in the art for natural gemstones which have incorporated or encapsulated material from a human or an animal.

SUMMARY OF THE INVENTION

In one aspect, the present invention is a natural diamond, which comprises an internal portion comprising material produced from humans and animals, which internal portion us substantially transparent and which have an index of refraction substantially matching that of the diamond. The human or animal material may have been obtained from living or deceased human or animals. The human or animal material may include, without limitation, skin, nails or hair, or any other suitable material of human or animal material.

In another aspect, the invention may comprise a method of incorporating human or animal material into a gemstone such as a diamond, comprising the steps of:
(a) creating ashes from the human or animal material;
(b) mixing the ashes with a lead compound and a chloride;
(c) creating an internal passageway within the gemstone;
(d) filling the passageway with the mixture;
(e) heating the gemstone to melt the mixture without graphitization;
(f) cooling the gemstone slowly to allow crystallization of the mixture within the passageway.

The gemstones which are used in the process, or which result from the process, are preferably naturally occurring diamonds, but are not restricted to such natural diamonds.

DETAILED DESCRIPTION OF THE INVENTION

The present invention provides for gemstones, and diamonds in particular, incorporating material of human or animal origin. When describing the present invention, all terms not defined herein have their common art-recognized meanings.

The process of the present invention may begin with the preparation of a diamond to create entry points and internal passages. Laser technology which etches or cuts diamonds is well known in the industry.

Laser drilling is a technique used to drill one or several microscopic holes into a diamond. The primary purpose of such drilling is to flush out a dark inclusion to improve the appearance of a diamond, often raising the apparent clarity grade of the diamond and making it more saleable or more valuable. In laser drilling a diamond, a beam of high-energy light is used to bore a small tunnel from the surface of the diamond to the targeted inclusion. Then, strong acid is forced down the tunnel to bleach out or burn away the inclusion. The process leaves small open drill holes in the surface of a diamond, not generally noticeable, except under the microscope. Soon after laser drilling was introduced, the jewelry industry insisted that the seller disclose to a buyer the presence of drill holes in the diamond. This became standard industry practice but may not be practiced by all those in the jewelry industry. Laser drilling is considered by some as merely a part of the fashioning process and therefore something that is no longer necessary to disclose.

The human or animal material may be taken from living or deceased subjects. If deceased, the material may comprise ashes produced during a cremation process. In either case, the material may originate from material such as skin, hair or nails, which may be routinely removed and kept. Other material such as flesh, bone or other body materials may also be utilized with the present invention.

Ashes produced from human or animal material comprise calcium phosphate along with some carbon. Theses ashes may then be mixed with a lead (Pb) compound such as lead monoxide (PbO) and a chloride such as sodium or potassium chloride. Preferably, a bromide compound such as sodium bromide (NaBr) is also added to the mixture. These three chemicals form the basis of a glass-like material and when crystallized together, form a material having a refractive index higher than 2.4 and very similar to that of a natural diamond of 2.417.

In one embodiment, the chloride, lead and bromide are mixed in a 15:55:30 ratio by weight. The ratios may be varied to vary the color of the resulting mixture to match the diamond which is being processed. In an alternative embodiment, a bismuth compound may be used in place of the bromide.

The resulting mixture has a melting point of about 575° C. This mixture is injected into the entry points and internal passages created in the diamond under high pressure (about 50 psi) and a temperature at which the mixture is molten. Preferably, all oxygen is removed prior to the high-temperature treatment. A reducing or inert atmosphere such as nitrogen prevents graphitization of the material.

Once the mixture has fully or substantially infiltrated the internal passages, the diamond is maintained at an elevated temperature (about 200° C.) below the melting point for a period of time, preferably about 2 hours. During this period, the mixture solidifies and forms a crystalline structure, which is substantially transparent and has substantially the same index of light refraction as the diamond. At the same time, the crystalline structure bonds to the diamond by a diffusion process. The diamond may then be cooled to ambient temperature slowly, preferably over another 72 hour period.

The passages in the diamond may then be sealed, optionally, with a thin synthetic diamond coat. In addition, the diamond may then be refacetted or repolished if desirable or necessary.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

What is claimed is:

1. A method of incorporating human or animal material into a gemstone, comprising the steps of:
   (a) creating ashes from the human or animal material;
   (b) mixing the ashes with lead or a lead compound and a chloride to form a mixture;
   (c) creating an internal passageway within the gemstone;
   (d) filling the passageway with the mixture;
   (e) heating the gemstone to melt the mixture without graphitization;
   (f) cooling the gemstone slowly to allow crystallization of the mixture within the passageway.

2. The method of claim 1 wherein the lead compound comprises lead monoxide.

3. The method of claim 1 or 2 wherein the mixing step further comprises mixing the ashes with a bromide compound.

4. A gemstone incorporating material of human or animal origin, the gemstone comprising: an internal passageway filled with a structure formed from ashes created from material of human or animal origin, a lead compound and a chloride such that said structure is similarly transparent and light refractive as the gemstone itself.

5. The gemstone of claim 4 wherein the gemstone is a diamond.

6. The gemstone of claim 5 wherein the structure further comprises a bromide.

7. The gemstone of claim 6 wherein the lead compound comprises lead monoxide, the chloride comprises sodium chloride and the bromide comprises sodium bromide.

* * * * *